Sept. 20, 1971    TERUYA TSURUZAWA    3,605,630
DEVICE FOR TRANSPORTING A CART
Filed May 27, 1969    2 Sheets-Sheet 1

TERUYA TSURUZAWA
INVENTOR

BY *[signature]*
ATTORNEY

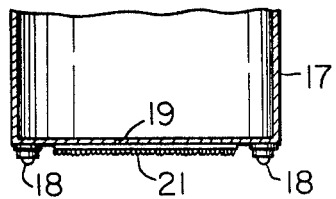
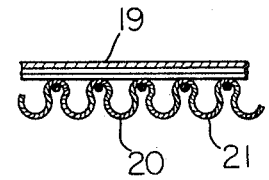
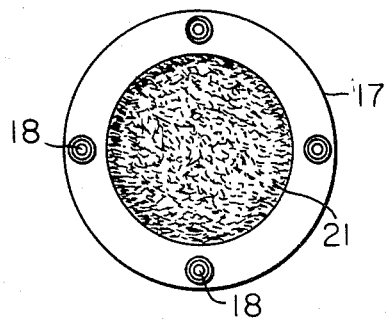
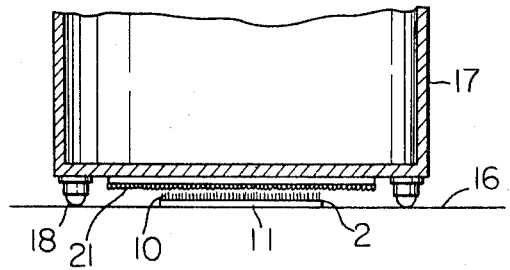

United States Patent Office 3,605,630
Patented Sept. 20, 1971

3,605,630
DEVICE FOR TRANSPORTING A CART
Teruya Tsuruzawa, Suita-shi, Osaka, Japan, assignor to Nihon Seal Co., Ltd., Osaka, Japan
Filed May 27, 1969, Ser. No. 828,312
Int. Cl. B61b 13/12
U.S. Cl. 104—165      4 Claims

ABSTRACT OF THE DISCLOSURE

A device for transporting carts, provided on the bottom surface with pile, engaging pile provided on the top surface of a conveyor belt; supported by the surface of the working floor of a shop. The conveyor belt is a flexible, endless belt system with pulleys, guide rolls, drive pulleys and power source. The guide and driving systems provided two parallel tracks for transporting the carts in two directions opposite to each other. The drive guide systems are submerged below the floor level, so not to obstruct movement of the carts when off the conveyor belt tracks. As the carts are moved to straddle the conveyor belt, the pile on the carts will engage the upper pile of the conveyor belt. Carts are thus moved in one direction or the other.

BACKGROUND OF THE INVENTION

The present invention relates to a novel and useful device for transporting a cart, and more particularly, to a device for transporting a cart provided with pile means at the bottom surface thereof by engagement of this pile means with pile means provided on one surface of a conveyer belt means which is fed on the surface of a floor along therewith with the one surface facing upwardly, the floor being flat or inclined.

Heretofore, in the textile industry, slivers were transported in a textile industry by manually moving carts on which two cans containing the slivers to be transported are loaded. The cans are large in size such as of the diameter of 60 cm. and of the height of 90 cm. and very heavy about 40 kg. in weight when the slivers are loaded therein. Therefore, the transportation of the slivers is very troublesome work and inefficient in the textile industry.

The present invention aims at avoiding the above described inconvenience in the prior art and providing a novel and useful device for transporting carts without requiring troublesome manual operation for the transportation.

SUMMARY OF THE INVENTION

An object of the present invention is to provide a novel and useful device for transporting a cart.

The object of the present invention is achieved in accordance with the present invention by providing pile means at the bottom surface of the cart and providing a conveyer belt means adapted to be fed on the surface of the floor in the desired direction and the extent for the transportation of the cart, pile means being provided on the surface of the conveyor belt means inclined toward the direction of the advance of the conveyer belt means, which pile means is adapted to engage with the pile means on the bottom surface of the cart when the same is loaded on the conveyer belt means so that the cart is positively transported by the conveyer belt means by virtue of the firm engagement of the pile means on the bottom surface of the cart with the pile means on the surface of the conveyer belt means.

In accordance with another feature of the present invention, pile means is provided on the opposite side of the conveyer belt means, which pile means is inclined in the direction opposite to that of the advance of the conveyer belt means. The conveyer belt means is in the form of an endless belt and stretched between two spaced apart belt guiding means including at least one driving pulley so as to drive the conveyer belt means through looped passage thereby permitting two feeding tracks on the surface of the floor in one direction and the opposite direction thereto. The driving pulley is provided with pile means on the peripheral surface thereof, which pile means is inclined toward the direction of the rotation of the driving pulley. The conveyer belt means is so fed in the belt guiding means that the other side of the conveyer belt means, which is opposite to the side which engages with the cart, contacts at all times with the peripheral surface of the driving pulley so as to permit the pile means on the above described other side of the conveyer belt means to firmly engage with the pile means on the peripheral surface of the driving pulley thereby insuring positive driving of the conveyer belt means by means of the driving pulley.

As described above, a cart can be efficiently transported by the device of the present invention in either of the forward and the backward directions, i.e. in one direction and the opposite direction thereto, without requiring any manual driving of the cart by merely loading the cart on the conveyer belt means.

BRIEF DESCRIPTION OF THE DRAWINGS

FIG. 5 is a fragmentary longitudinal sectional view of the bottom portion of a cart for use with the device of the present invention;

FIG. 6 is a bottom view showing the bottom surface of the cart;

FIG. 7 is a fragmentary view showing in enlarged scale the looped pile layer attached to the bottom surface of the cart; and FIG. 8 is a sectional view showing the relationship between the looped pile layer of the cart and the pile means on the conveyer belt means.

DETAILED DESCRIPTION OF THE PREFERRED EMBODIMENT

Figure 1:
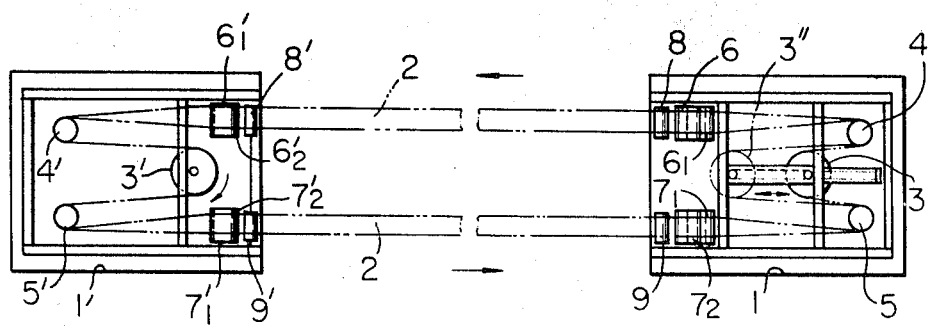
FIG. 1 is a plan view showing the general construction of the device of the present invention.
Figure 2:
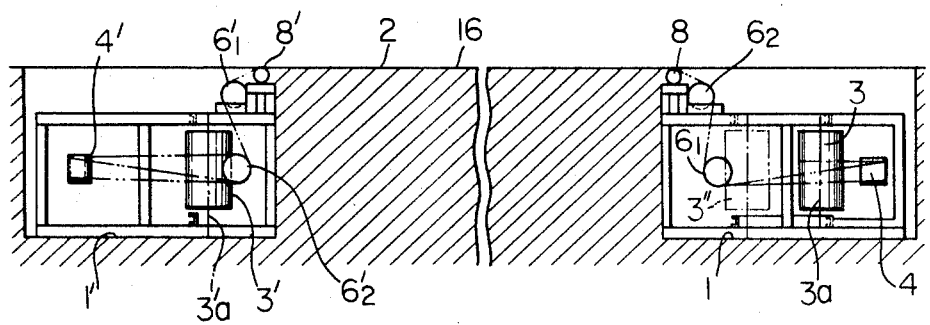
FIG. 2 is a longitudinal sectional view of FIG. 1.
Figure 3:
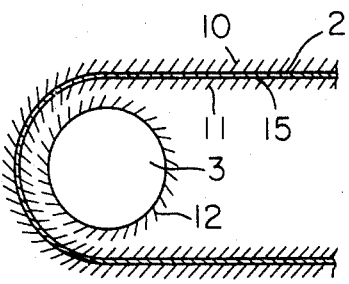
FIG. 3 is a fragmentary view showing the driving portion of the device of FIG. 1 in enlarged scale.
Figure 4:
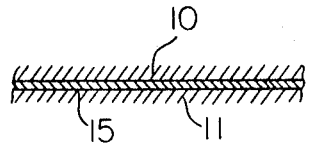
FIG. 4 is a longitudinal sectional view of a portion of the conveyer belt means of the present invention.

Referring to FIGS. 1 and 2, pits 1 and 1' are provided in floor 16 in spaced apart relationship from each other in the direction and to the extent desired for the transportation of the cart. Conveyer belt means 2 in the form of an endless belt is stretched around pulley means 3 and 3' rotatably provided in the pits 1, 1', respectively, so that two stretches of the conveyer belt means 2 are located on the surface of the floor 16. As seen in the figure, the pulley means 3, 3' are rotated about their vertical axes 3a, 3'a, respectively, and at least one of the pulley means 3, 3' is driven in by driving means (not shown) so as to drive the conveyer belt means 2 stretched around the same. The conveyer belt means 2 is fed from the pulley 3 toward guide roller 4, which is provided in the pit 1 so as to rotate about the vertical axis thereof, and is turned back around guide roller 4 toward guide roller 6, which is also provided in pit 1 so as to rotate about the horizontal axis thereof. The belt 2 is twisted by 90° around its longitudinal center line during the feeding thereof between the roller 4 and the roller 6, as seen in the figure, so that the surface of the belt 2 contacting with the pulley 3 is faced downwardly when the belt 2 reaches roller $6_1$. The belt 2 is then fed to horizontal guide rollers $6_2$ and 8 and leaves the roller 8 so that the belt 2 is fed toward the pit 1' along the surface of the floor 16 with the surface of the belt 2 which is opposite to the surface contacting with the pulley 3 facing upwardly. The belt 2 fed to the pit 1' is first guided by horizontal guide rollers 8', $6_1$', in the pit 1' and the guided around horizontal guide roller $6_2$' toward vertical guide roller 4' in the pit 1' as seen in the figure. The belt 2 is twisted about its longitudinal center line by 90° during the feeding thereof between the roller $6_2$' and the roller 4' so that the side of the belt 2 facing to the floor 16 during the feeding thereof on the floor 16 is faced in the direction opposite to that toward the peripheral surface of roller 4'. The belt 2 is then turned back around the roller 4' toward the pulley 3' so that the surface of belt 2 contacting with the floor 16 during the feeding thereof on the floor 16 is contacted with the periphery of the pulley 3'. In the similar way, the belt 2 is guided from the pulley 3' through vertical guide roller 5', horizontal guide rollers $7_2$', $7_1$' and 9' to the floor 16 and then to horizontal guide rollers 9, $7_2$ and $7_1$ and, then, to vertical guide roller 5, and around the roller 5 to the pulley 3, thus forming the loop of the belt 2. In like manner as described previously, the belt 2 is twisted about its longitudinal center line by 90° between the roller 5' and the roller $7_2$' as well as between the roller $7_1$ and the roller 5 so that the surface of the belt 2 contacting with the periphery of the pulleys 3, 3' faces to the surface of the floor 16 during the feeding thereof on the floor 16.

As seen in FIG. 1, the rollers 4, $6_1$, $6_2$ and 8 and the rollers 5, $7_1$, $7_2$ and 9 are symmetrically located with respect to the longitudinal center line passing through the pits 1 and 1' and, also the rollers 4', $6_2$', $6_1$' and 8' and the rollers 5', $7_2$', $7_1$' and 9' are symmetrically located with respect to the longitudinal center line passing through the pits 1 and 1'.

It is apparent that the conveyer belt means 2 provides two feeding tracks in one direction and the opposite direction thereto formed by the two stretches of the belt 2 fed on the surface of the floor 16.

Means may be provided for keeping the belt in appropriately tensioned state by shifting the pulley 3, for example, to the position as indicated by the pulley 3'' shown by the chain line.

In accordance with the characteristic feature of the present invention, pile means 10 is provided on the surface of the belt 2 which surface is directed upwardly during the feeding of the belt 2 on the floor 16 while pile means 11 is provided on the opposite surface of the belt 2 which is facing to the surface of the floor 16 during the feeding of the belt 2 on the floor 16. The pile means 10, 11 is comprised of a plurality of piles made of synthetic fibers or natural fibers or a plurality of wires secured to a seal belt 15 forming the base of the conveyer belt means 2. The pile means 10 is secured to the seal belt 15 so that it is inclined toward the direction of the advance of the belt 2 while the pile means 11 is directed toward the direction opposite to that of the advance of the belt 2.

At the same time, the peripheral surface of at least one of the pulley means 3, 3' which is driven by the driving means for driving the belt 2 is provided with pile means 12 which is inclined toward the direction of the rotation of the pulley means on the periphery of which the pile means is provided.

Thus, the conveyer belt means 2 is positively driven by at least one of the pulley means 3, 3' by virtue of the firm engagement of the pile means 11 of the conveyer belt means 2 with the pile means 12 provided on the periphery of at least one of the pulley means 3, 3'.

Since the pile means 11 is inclined toward the direction opposite to that of the advance of the conveyer belt means 2, the pile means 11 will not resist against the feeding of the conveyer belt means 2 on the surface of the floor 16.

The can 17 to be transported by means of the conveyer belt means 2 is provided with four caster wheels 18 at the bottom of the cart 17 so that the can 17 forms a cart which can be moved on the floor 16 in any directions by means of the caster wheels 18. At the same time, the bottom surface of the can 17 is provided with an elastic plate 19 made of a material such as urethane foam secured to the bottom surface of the can 17 by means such as a bonding agent. Pile means 21 similar to that provided on the belt 2 is provided on the surface of the elastic plate 19 so that the pile means 21 is firmly engaged with the pile means 10 on the surface of the belt 2 when the can 17 that is the cart is loaded on the portion of the belt 2 which is fed on the floor 16.

Each element 20 of the pile means 21 on the elastic plate 19 is in the form of a loop and is adapted to be directed to any directions so that the pile means 21 can be firmly engaged with the pile means 10 of the belt 2 when the cart 17 is loaded on the belt 2 running on the floor 16.

In operation of the device of the present invention, the belt 2 is driven by the pulley means 3 and/or 3' driven by the driving means so that the two stretches of the belt 2 are fed along the surface of the floor 16 in one and the opposite directions with the surface of the belt 2 provided with the pile means 10 directed toward upwardly and with the pile means 10 being directed toward the direction of the advance of the belt 2. When a cart 17, i.e. the can provided with caster wheels 18 at the bottom thereof, is loaded on either of the stretches of the belt 2 fed on the surface of the floor 16, the pile means 21 at the bottom surface of the cart 17 is firmly engaged with the pile means 10 on the belt 2 so that the cart 17 can be transported by means of the belt 2 in either of the one or the opposite direction according to the feeding of the stretch of the belt 2 on which the cart 17 is loaded.

Since the belt 2 is fed on the floor 16, the movement of the cart 17 loaded on the belt 2 is stable, and any desired number of the carts 17 can be transported successively in any desired one or the opposite direction by merely loading the carts on the selected stretches of the belt 2 fed on the floor 16 without requiring any operators for manually transporting the carts 17 on the floor 16.

The device of the present invention is very simple in construction and produced at low cost while it is very durable. Thus, it is evident that the present invention provides a very useful and novel device for transporting a cart very efficiently and economically.

I claim:

1. In combination with a working floor, such as of a textile plant, utilizing at least one cart, a conveyor comprising in combination:

an endless conveyor belt provided on its opposite upper and lower surfaces with an upper cart-driving and a lower belt-driven pulley engaging pile of filaments, respectively, said filaments inclined at angles to said belt toward the direction of advance of said belt;

belt driving and deflecting means suspended below the working area of said floor in a plane on the working floor level;

said belt driving means including a belt-driving pulley provided at its surface engaging with said belt with a pile comprising filaments inclined at an angle toward the direction of the advance of the pile of the lower surface of said belt;

the upper, cart driving portions of said belt slidably supported by the working portion of said floor;

said cart provided at its bottom surface with a pile comprising filaments adapted to engage pile of the upper surface of said belt.

2. The combination as claimed in claim 1, wherein said belt deflecting means simultaneously divides the upper surfaces of said belt into two tracks running in opposite directions and spaced parallel to each other; said belt driving means comprising two spaced apart belt guiding and stretching means to provide the forwardly and rearwardly running cart-engaging tracks thereby permitting said cart to be positively transported in either of the forward or rearward directions by virtue of a firm engagement of said pile on the upper cart driving surface with the bottom surface of said cart when said cart is loaded on one of said tracks;

said belt being positively driven by virtue of the firm engagement of the pile of filaments of the belt driving pulley with the said lower pile surface of said belt.

3. Device according to claim 1, wherein means is provided for adjusting the tension of said belt by shifting the position of said pulley in one of said two spaced apart belt guiding means.

4. The combination of claim 2, wherein each of said belt guiding means comprises on each terminal loop of said belt a pulley positioned so as to rotate about vertical axes;

a pair of first guide rollers rotatable about vertical axes, respectively;

a pair of second guide rollers rotatable about horizontal axes;

and a pair of third guide rollers respectively, so that said belt is twisted about its longitudinal axis by 90° during the feeding thereof between said guide rollers thereby permitting said upper surface of said conveyor belt to face upwardly while it is fed on the surface of the floor and, at the same time, permitting said lower surface of said conveyor belt to contact the peripheral surface of said pulley in said two spaced apart belt guiding means.

References Cited
UNITED STATES PATENTS

| | | | |
|---|---|---|---|
| 2,826,319 | 3/1958 | Renner et al. | 214—89 |
| 2,941,410 | 6/1960 | Ota | 74—229 |
| 3,143,895 | 8/1964 | Robie | 74—229 |
| 3,179,238 | 4/1965 | Patin | 198—181 |
| 3,349,721 | 10/1967 | Carlier | 104—196 |

ARTHUR L. LA POINT, Primary Examiner

R. SAIFER, Assistant Examiner

U.S. Cl. X.R

104—178